US012565233B2

(12) United States Patent
Cohen et al.

(10) Patent No.: US 12,565,233 B2
(45) Date of Patent: *Mar. 3, 2026

(54) USING SIMULATIONS TO IDENTIFY DIFFERENCES BETWEEN BEHAVIORS OF MANUALLY-DRIVEN AND AUTONOMOUS VEHICLES

(71) Applicant: Waymo LLC, Mountain View, CA (US)

(72) Inventors: Brian Cohen, San Francisco, CA (US); Guillaume Dupre, San Francisco, CA (US); Jared Russell, San Francisco, CA (US); Eric Schoenfeld, San Francisco, CA (US); Jack Joseph Wanderman, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,670

(22) Filed: Nov. 8, 2023

(65) Prior Publication Data

US 2024/0083458 A1    Mar. 14, 2024

Related U.S. Application Data

(63) Continuation of application No. 16/912,976, filed on Jun. 26, 2020, now Pat. No. 11,851,086.

(51) Int. Cl.
B60W 60/00      (2020.01)
G01C 21/34      (2006.01)
(Continued)

(52) U.S. Cl.
CPC .... B60W 60/0011 (2020.02); B60W 60/0013 (2020.02); G01C 21/3407 (2013.01);
(Continued)

(58) Field of Classification Search
None
See application file for complete search history.

(56) References Cited

U.S. PATENT DOCUMENTS 7,424,414 B2    9/2008    Craft
8,965,621 B1    2/2015    Urmson et al.
(Continued)

OTHER PUBLICATIONS

Fadaie, Joshua G., The State of Modeling, Simulation, and Data Utilization within Industry, an Autonomous Vehicles Perspective, The Boeing Company, 2017.

*Primary Examiner* — Nhi Q Bui
(74) *Attorney, Agent, or Firm* — Botos Churchill IP Law

(57)      ABSTRACT

A simulation may be used to determine a difference between progress of a manually-driven vehicle and progress of a simulated autonomous vehicle. The method includes retrieving log data collected for the manually-driven vehicle driving along a route, generating a plurality of path segments for a portion of the route. The plurality of path segments corresponds to points in a lane that the manually-driven vehicle traveled through on the portion of the route. The method also includes running, using a software of the autonomous vehicle, a simulation of the autonomous vehicle driving along the plurality of path segments, extracting metrics from the log data and the simulation, and determining the difference between a first progress of the manually-driven vehicle and a second progress of the simulated autonomous vehicle based on the metrics.

22 Claims, 11 Drawing Sheets

(51) Int. Cl.
*G01C 22/00* (2006.01)
*G05D 1/00* (2006.01)

(52) U.S. Cl.
CPC ......... *G01C 21/3453* (2013.01); *G01C 22/00* (2013.01); *G05D 1/0088* (2013.01)

(56)              References Cited

U.S. PATENT DOCUMENTS

| | | | |
|---|---|---|---|
| 9,129,460 B2 | 9/2015 | Mcclellan et al. | |
| 10,347,150 B1 * | 7/2019 | Tamir | G09B 9/042 |
| 11,150,660 B1 * | 10/2021 | Kabirzadeh | G06F 30/15 |
| 2015/0066355 A1 | 3/2015 | Siegel et al. | |
| 2018/0024553 A1 | 1/2018 | Kong et al. | |
| 2018/0118219 A1 * | 5/2018 | Hiei | B60W 50/14 |
| 2018/0275656 A1 * | 9/2018 | Zhu | B60W 60/0016 |
| 2018/0292824 A1 | 10/2018 | Kazemi et al. | |
| 2018/0307236 A1 | 10/2018 | Reed | |
| 2019/0050520 A1 | 2/2019 | Alvarez et al. | |
| 2019/0084571 A1 | 3/2019 | Zhu et al. | |
| 2019/0129831 A1 | 5/2019 | Goldberg | |
| 2019/0213103 A1 * | 7/2019 | Morley | G06F 11/3608 |
| 2019/0220011 A1 | 7/2019 | Della Penna | |
| 2019/0220028 A1 * | 7/2019 | Anderson | G06N 5/022 |
| 2019/0318267 A1 | 10/2019 | Zhang et al. | |
| 2020/0150275 A1 | 5/2020 | Zhu et al. | |
| 2020/0183387 A1 | 6/2020 | Heit et al. | |
| 2021/0217254 A1 | 7/2021 | Hashimoto et al. | |
| 2021/0394787 A1 * | 12/2021 | Xiao | B60W 60/0027 |
| 2021/0394797 A1 * | 12/2021 | Ran | G08G 1/0112 |

* cited by examiner

110 — Computing Device(s)

120 — Processor(s)

130 — Memory

132 — Data

134 — Instructions

150 — User Input

152 — Internal Electronic Display

154 — Speakers

156 — Wireless Network Connection(s)

160 — Deceleration System

162 — Acceleration System

164 — Steering System

166 — Signaling System

168 — Routing System

170 — Positioning System

172 — Perception System

174 — Power System (Engine)

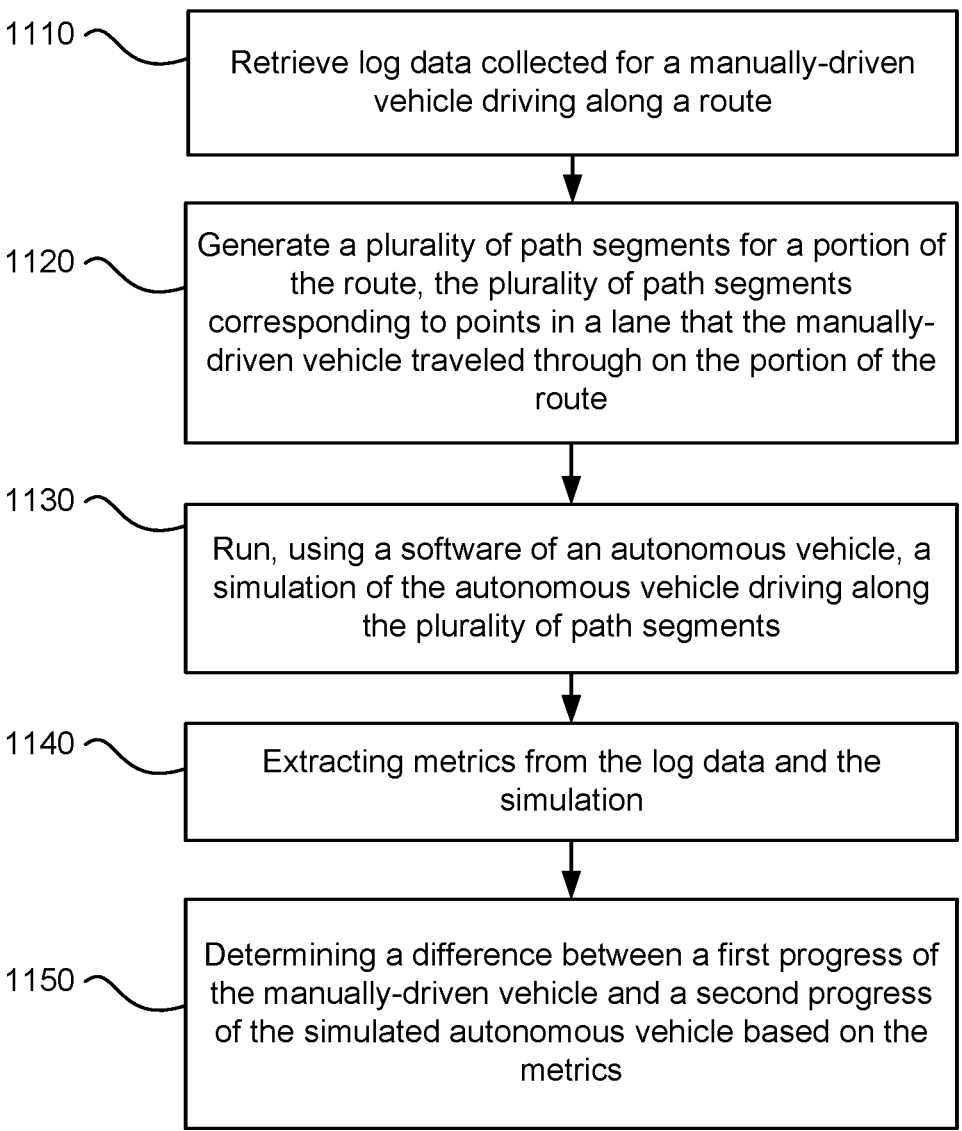

1110 — Retrieve log data collected for a manually-driven vehicle driving along a route 1120 — Generate a plurality of path segments for a portion of the route, the plurality of path segments corresponding to points in a lane that the manually-driven vehicle traveled through on the portion of the route 1130 — Run, using a software of an autonomous vehicle, a simulation of the autonomous vehicle driving along the plurality of path segments 1140 — Extracting metrics from the log data and the simulation 1150 — Determining a difference between a first progress of the manually-driven vehicle and a second progress of the simulated autonomous vehicle based on the metrics

USING SIMULATIONS TO IDENTIFY DIFFERENCES BETWEEN BEHAVIORS OF MANUALLY-DRIVEN AND AUTONOMOUS VEHICLES

CROSS REFERENCE TO RELATED APPLICATIONS

The present application is a continuation of U.S. patent application Ser. No. 16/912,976, filed Jun. 26, 2020, the entire disclosure of which is incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location, for instance, by determining and following a route which may require the vehicle to respond to and interact with other road users such as vehicles, pedestrians, bicyclists, etc. It is critical that the autonomous control software used by these vehicles to operate in the autonomous mode is tested and validated before such software is actually used to control the vehicles in areas where the vehicles are interacting with other objects.

BRIEF SUMMARY

Aspects of the disclosure provide for a method for determining a difference between progress of a manually-driven vehicle and progress of a simulated autonomous vehicle. The method include retrieving, by one or more processors, log data collected for the manually-driven vehicle driving along a route; generating, by the one or more processors, a plurality of path segments for a portion of the route, the plurality of path segments corresponding to points in a lane that the manually-driven vehicle traveled through on the portion of the route; running, by the one or more processors using a software of the autonomous vehicle, a simulation of the autonomous vehicle driving along the plurality of path segments; extracting, by the one or more processors, metrics from the log data and the simulation; and determining, by the one or more processors, a difference between a first progress of the manually-driven vehicle and a second progress of the simulated autonomous vehicle based on the metrics.

In one example, the method includes determining, by the one or more processors, an adjustment to the software of the autonomous vehicle based on the determined difference to cause the software to operate the autonomous vehicle more similarly to the manually-driven vehicle. In this example, the determining of the adjustment optionally includes altering a passenger discomfort level permitted for a type of location or a type of maneuver associated with the portion of the route. Also in this example, the determining of the adjustment optionally includes altering an amount of buffer given to a type of object. In another example, the software is a first software, and the method also includes running, by the one or more processors, the simulation for the autonomous vehicle for each of one or more second software; determining, for each second software, by the one or more processors, a second difference between the first progress of the manually-driven vehicle and second progress of the simulated autonomous vehicle; and selecting, by the one or more processors, a given software from the first software and the one or more second software that is a closest in progress to the first progress of the manually-driven vehicle.

In a further example, the method also includes estimating, by the one or more processors, a frequency of progress issues for autonomous vehicles in a region of roadways. In yet another example, the method also includes selecting, by the one or more processors, the portion of the route based on a type of location. In a still further example, the method also includes selecting, by the one or more processors, the portion of the route based on user input. In another example, the determining of the difference between the first progress of the manually-driven vehicle and the second progress of the simulated autonomous vehicle based on the metrics includes computing a first distance traveled by the manually-driven vehicle along the portion of the route within an amount of time, computing a second distance traveled by the simulated autonomous vehicle along the portion of the route within the amount of time, and determining the difference to be the simulated autonomous vehicle progressed less than the manually-driven vehicle when the first distance is greater than the second distance. In a further example, the determining of the difference between the first progress of the manually-driven vehicle and the second progress of the simulated autonomous vehicle based on the metrics includes computing a first distance traveled by the manually-driven vehicle along the portion of the route within an amount of time, computing a second distance traveled by the simulated autonomous vehicle along the portion of the route within the amount of time, and determining the difference to be the simulated autonomous vehicle progressed further than the manually-driven vehicle when the first distance is less than the second distance.

Other aspects of the disclosure provide for a non-transitory, tangible computer-readable medium on which computer-readable instructions of a program are stored. The instructions, when executed by one or more computing devices, cause the one or more computing devices to perform a method for implementing a simulation for autonomous control software for an autonomous vehicle. The method includes retrieving log data collected for a manually-driven vehicle driving along a route; generating a plurality of path segments for a portion of the route, the plurality of path segments corresponding to points in a lane that the manually-driven vehicle traveled through on the portion of the route; running, using a software of the autonomous vehicle, the simulation of the autonomous vehicle driving along the plurality of path segments; extracting metrics from the log data and the simulation; and determining a difference between a first progress of the manually-driven vehicle and a second progress of the simulated autonomous vehicle based on the metrics.

In one example, the method also includes determining an adjustment to the software of the autonomous vehicle based on the determined difference to cause the software to operate the autonomous vehicle more similarly to the manually-driven vehicle. In this example, the determining of the adjustment optionally includes altering a passenger discomfort level permitted for a type of location or a type of maneuver associated with the portion of the route. Also in this example, the determining of the adjustment optionally includes altering an amount of buffer given to a type of object. In another example, the software is a first software and the method also includes running the simulation for the autonomous vehicle for each of one or more second software, determining, for each second software, a second difference between the first progress of the manually-driven vehicle and second progress of the simulated autonomous vehicle, and selecting a given software from the first software and the one or more second software that is a closest in progress to the first progress of the manually-driven vehicle.

In a further example, the method also includes estimating a frequency of progress issues for autonomous vehicles in a region of roadways. In yet another example, the method also includes selecting the portion of the route based on a type of location. In a still further example, the method also includes selecting the portion of the route based on user input. In another example, the determining of the difference between the first progress of the manually-driven vehicle and the second progress of the simulated autonomous vehicle based on the metrics includes computing a first distance traveled by the manually-driven vehicle along the portion of the route within an amount of time, computing a second distance traveled by the simulated autonomous vehicle along the portion of the route within the amount of time, and determining the difference to be the simulated autonomous vehicle progressed less than the manually-driven vehicle when the first distance is greater than the second distance. In a further example, the determining of the difference between the first progress of the manually-driven vehicle and the second progress of the simulated autonomous vehicle based on the metrics includes computing a first distance traveled by the manually-driven vehicle along the portion of the route within an amount of time, computing a second distance traveled by the simulated autonomous vehicle along the portion of the route within the amount of time, and determining the difference to be the simulated autonomous vehicle progressed further than the manually-driven vehicle when the first distance is less than the second distance.

BRIEF DESCRIPTION OF THE DRAWINGS

FIG. 11 is an example flow diagram in accordance with aspects of the disclosure.

DETAILED DESCRIPTION

Overview

Figure 1:
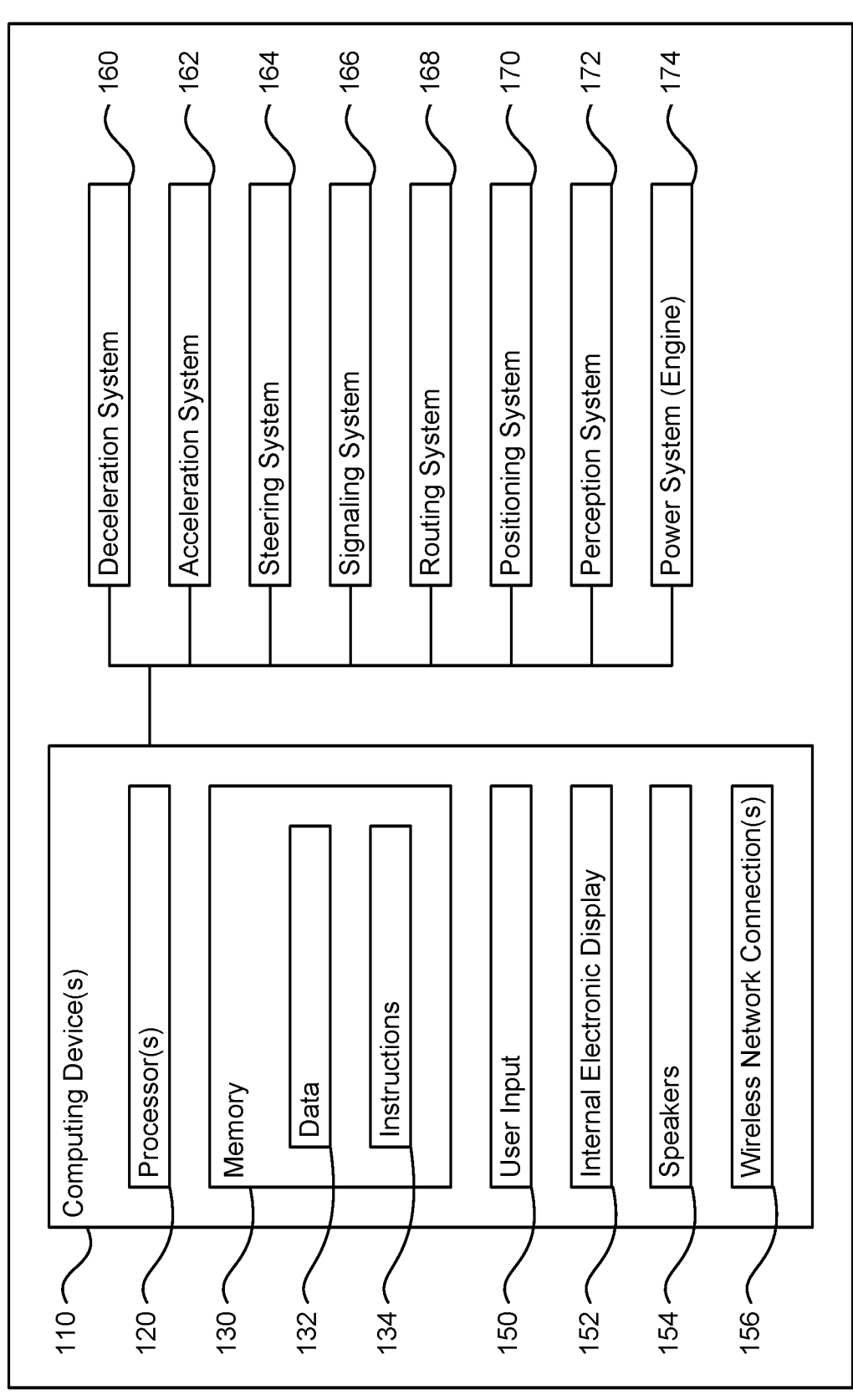
FIG. 1 is a functional diagram of an example vehicle in accordance with aspects of the disclosure.

The technology relates to using simulations to identify differences in driving behavior between a manually-driven vehicle and an autonomous vehicle. By comparing data collected in a manually-driven vehicle to data from a simulated autonomous vehicle along a same route, key differences can be identified such as when the simulated autonomous vehicle progresses less or more than the manually-driven vehicle. The key differences may be used to discover ways to improve the behavior of the autonomous vehicle. For example, improvements to operating styles for the vehicle or routing for the vehicle may be discovered.

To identify differences between behaviors of manually-driven and autonomous vehicles, the simulation system may be configured to receive log data from a manually-driven vehicle. The log data may be data that was collected from one or more systems of the manually-driven vehicle as the manually-driven vehicle was driven along a route, the route comprising a series of roadways. For a portion of the route, the simulation system may create a plurality of path segments. Each of the plurality of path segments may be defined by a start point in a lane and an end point in a lane that the manually-driven vehicle traveled through while on the route.

Using the plurality of path segments, the simulation system may run a simulation of the software of the autonomous vehicle traveling along the portion of the route. The short length of the path segments may allow the simulated autonomous vehicle to follow the same path as the manually-driven vehicle, thereby preventing the software for the autonomous vehicle from taking a different path between the two end points. The simulation system may extract one or more metrics from the log data of the manually-driven vehicle and the simulation of the autonomous vehicle. Based on the one or more metrics, the simulation system may determine a difference between a progress of the manually-driven vehicle along the route and a progress of the simulated autonomous vehicle along the route. In particular, the difference may be that the simulated autonomous vehicle has progressed less than the manually-driven vehicle or has progressed more than the manually-driven vehicle.

An adjustment to the software may be determined based on the determined difference to cause the software to operate the autonomous vehicle more similarly to the manually-driven vehicle. In other implementations, the simulation may be used to test various software for autonomous vehicles and compare how each of the various software performs in comparison to the manually-driven vehicle. The various software may include the same software with different adjustments. One software of the various software may be selected as performing closest to the manually-driven vehicle. In a further implementation, the simulation may be used to estimate a rate or frequency of progress is sues for autonomous vehicles in a region of roadways or a type of roadways. The region may be, for example, a particular city. Using the estimated rate or frequency of progress issues for compare software performance from region to region. The software may then be customized for a given region.

The technology described herein allows for a safe and effective way of testing software for autonomous vehicles. Using the technology as described may also provide an efficient identification of key differences between the behavior of a simulated autonomous vehicle and that of a manually-driven vehicle. The key differences may also be more accurately identified by using manual driving data than using previous versions of the software for autonomous vehicles. The key differences may then be used to adjust the software for autonomous vehicles to generate a better ride experience for passengers of an autonomous vehicle by reducing overyielding and increasing caution depending on the circumstances. Driving autonomously in city environments may therefore be improved. The software may be continually improved using the simulation technology.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may have all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio-visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may capable of communicating with various components of the vehicle in order to control the movement of vehicle 100 according to the autonomous control software of memory 130 as discussed further below. For example, returning to FIG. 1, computing devices 110 may be in communication with various systems of vehicle 100, such as deceleration system 160, acceleration system 162, steering system 164, signaling system 166, routing system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
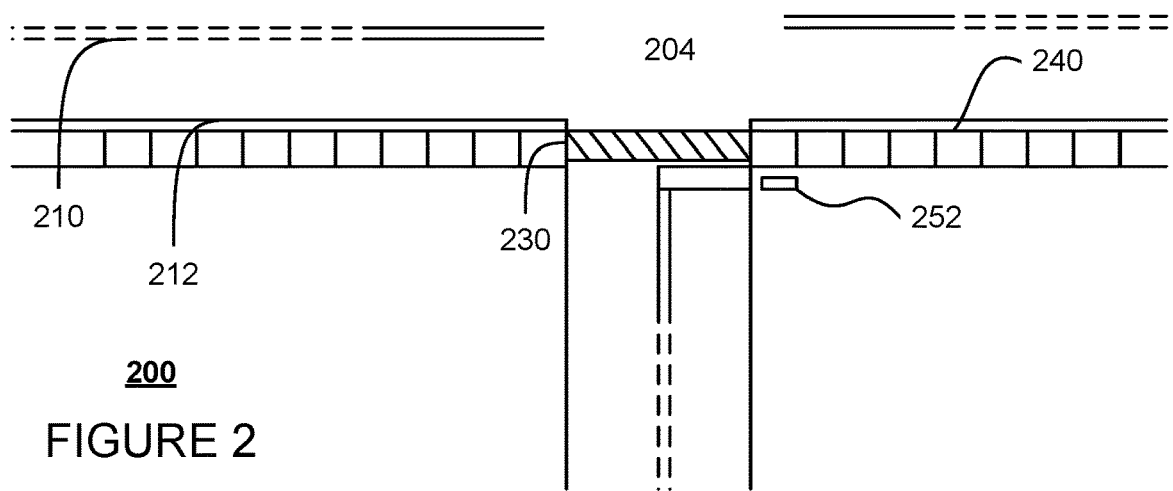
FIG. 2 is an example of map information in accordance with aspects of the disclosure.

FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
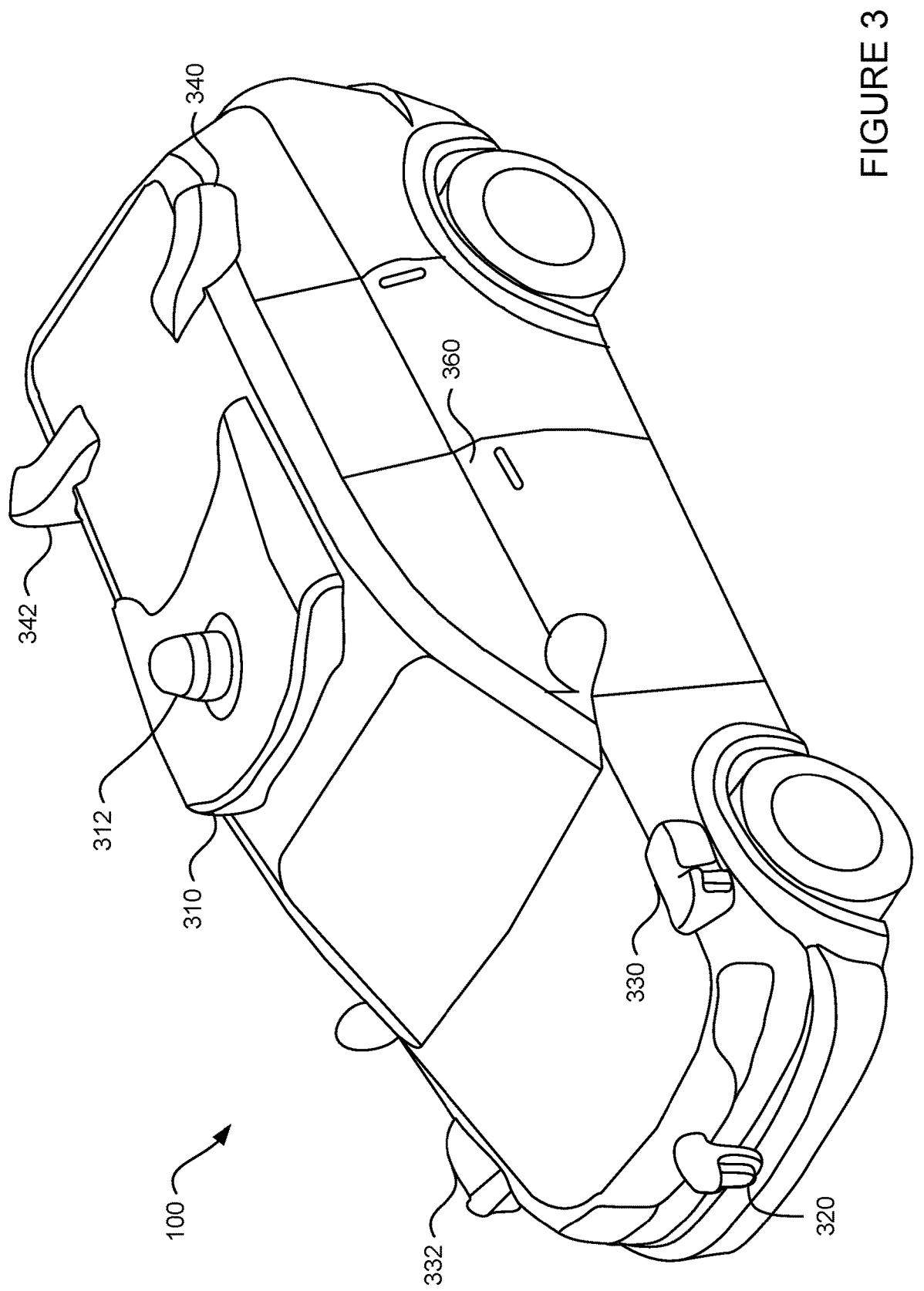
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may control the direction and speed of the vehicle by controlling various components. By way of example, computing devices 110 may navigate the vehicle to a destination location completely autonomously using data from the detailed map information and routing system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
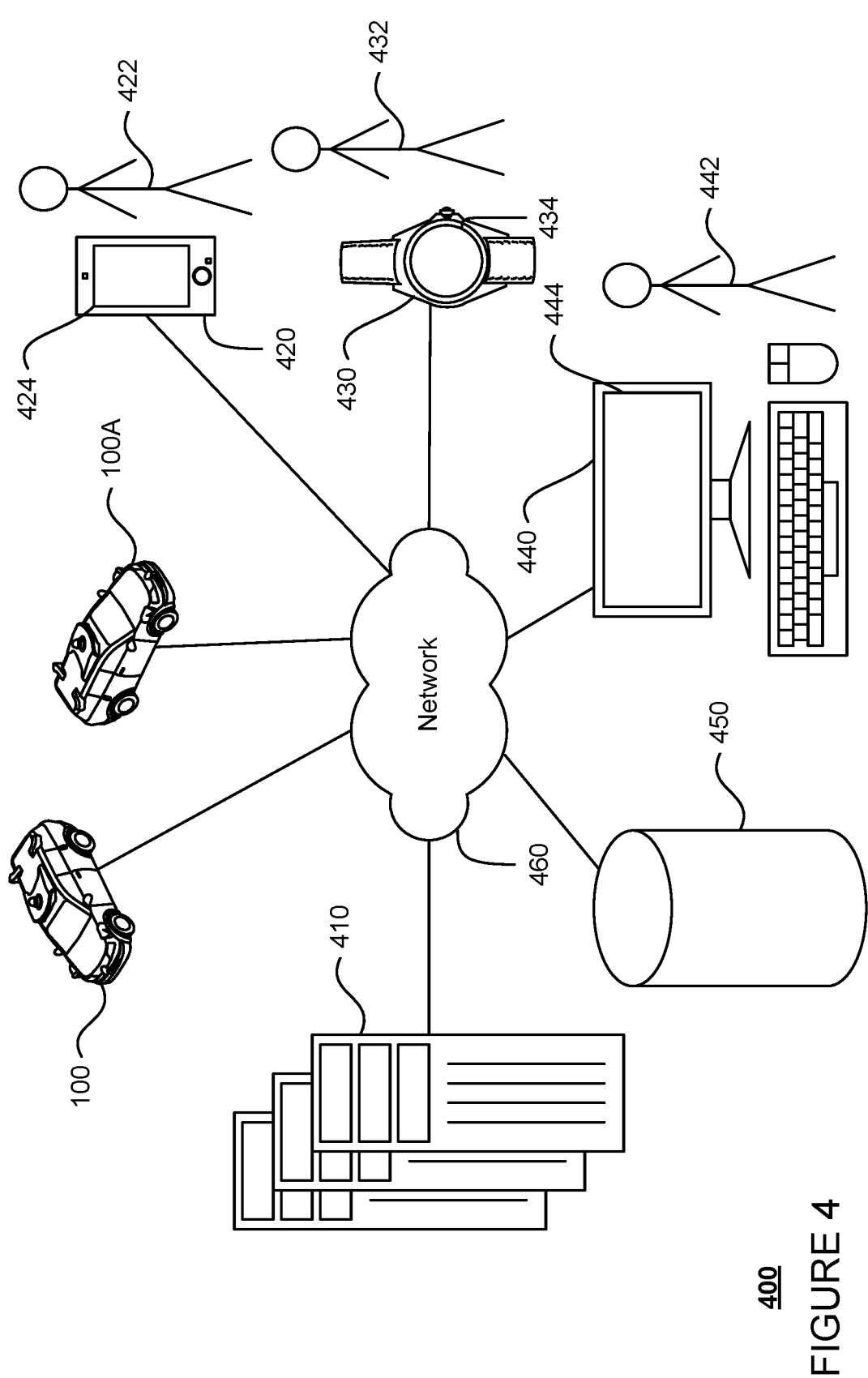
FIG. 4 is a pictorial diagram of an example system in accordance with aspects of the disclosure.
Figure 5:
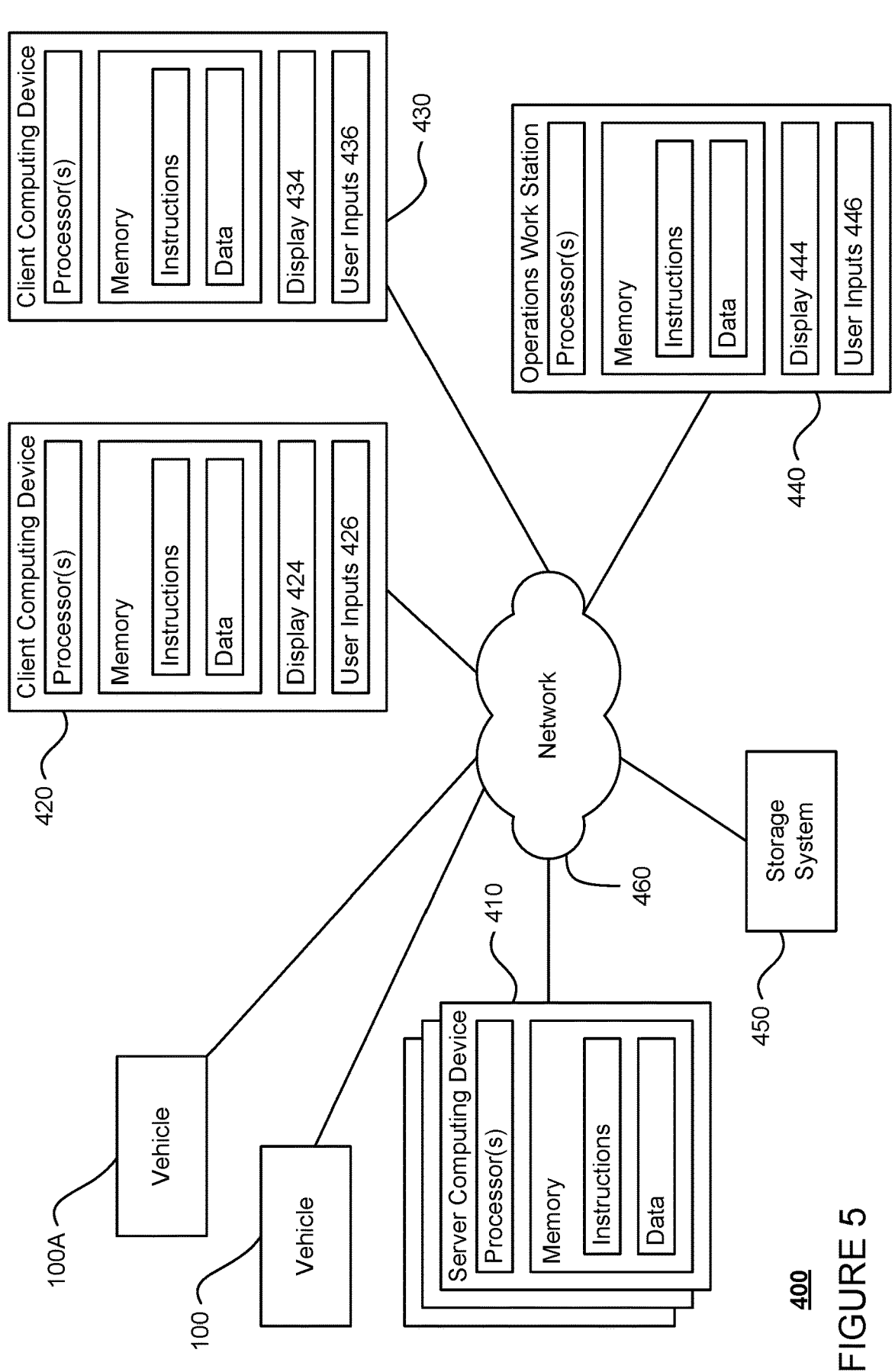
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100 and vehicle 100A, which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a validation computing system which can be used to validate autonomous control software which vehicles such as vehicle 100 and vehicle 100A may use to operate in an autonomous driving mode. The validation computing system may additionally or alternatively be used to run simulations for the autonomous control software as further described below. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be an operations workstation used by an administrator or operator to review simulation outcomes, handover times, and validation information. Although only a single operations workstation 440 is shown in FIGS. 4 and 5, any number of such work stations may be included in a typical system. Moreover, although the operations workstation is depicted as a desktop computer, operations workstations may include various types of personal computing devices such as laptops, netbooks, tablet computers, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, storage system 450 may store log data. This log data may include, for instance, sensor data generated by a perception system, such as perception system 172 of vehicle 100 as the vehicle is being driven autonomously or manually. Additionally or alternatively, the log data may be generated from one or more sensors positioned along a roadway or mounted on another type of vehicle, such as an aerial vehicle. As an example, the sensor data may include raw sensor data as well as data identifying defining characteristics of perceived objects such as shape, location, orientation, speed, etc. of objects such as vehicles, pedestrians, bicyclists, vegetation, curbs, lane lines, sidewalks, crosswalks, buildings, etc. The log data may also include "event" data identifying different types of events such as collisions or near collisions with other objects, planned trajectories describing a planned geometry and/or speed for a potential path of the vehicle 100, actual locations of the vehicle at different times, actual orientations/headings of the vehicle at different times, actual speeds, accelerations and decelerations of the vehicle at different times, classifications of and responses to perceived objects, behavior predictions of perceived objects, status of various systems (such as acceleration, deceleration, perception, steering, signaling, routing, power, etc.) of the vehicle at different times including logged errors, inputs to and outputs of the various systems of the vehicle at different times, etc. As such, these events and the sensor data may be used to "recreate" the vehicle's environment, including perceived objects, and behavior of a vehicle in a simulation.

In addition, the storage system 450 may also store autonomous control software which is to be used by vehicles, such as vehicle 100, to operate a vehicle in an autonomous driving mode. This autonomous control software stored in the storage system 450 may be a version which has not yet been validated. Once validated, the autonomous control software may be sent, for instance, to memory 130 of vehicle 100 in order to be used by computing devices 110 to control vehicle 100 in an autonomous driving mode.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to test and/or validate the autonomous control software which will be stored in memory 130 for use by the computing devices 110 of vehicle 100, the server computing devices 410 may run various simulations. In particular, a simulation may be run to compare the behavior of the autonomous control software to a manually-driven vehicle. The simulation may be a log-based simulation that is generated from the information stored in the aforementioned log data of storage system 450.

In this regard, the server computing devices 410 may access the storage system 450 in order to retrieve the log data collected along a route of the vehicle 100 for a simulation. The route of the vehicle may include a series of road segments. The server computing devices 410 may retrieve a portion of the log data that was collected from or collected for a manually-driven vehicle along a portion of the route from the storage system. The portion of the log data may include object data and/or event data. In addition, the portion of the log data may have been collected using the perception system on the manually-driven vehicle or using another sensor positioned elsewhere that collected data related to the manually-driven vehicle along the portion of the route. The portion of the route may be identified by the server computing devices 410 based on a set of criteria. The criteria may include types of locations, such as intersections, types of events, or statistics for locations, such as areas having a high number of differences between manually-driven and autonomous vehicles or areas having a high amount of traffic. These areas may be identified using heat maps. In other implementations, the portion of the route may be identified by user input.

The retrieved portion of log data may be used to generate the simulation. Detected information of the log data, including sensor data or events, may be "played" as input to the perception system 172 of a simulated vehicle controlled by the autonomous control software. In this regard, the autonomous control software "experiences" or processes the log data as if the autonomous control software was actually being run on vehicle 100, which collected the log data. In other words, the simulation may include object data defining characteristics of objects such as shape, location, orientation, speed, etc. of objects such as vehicles, pedestrians, bicyclists, vegetation, curbs, lane lines, sidewalks, cross-walks, buildings, etc. defined by the sensor data of the log data. Further, the simulation may include vehicle data corresponding to characteristics of vehicle 100 to be used for a simulated vehicle, including the vehicle's shape, location, orientation, speed, etc. defined by the events of the log data. In addition, the software may include various modules corresponding to the system of vehicle 100, such as a perception system, a planning system, and control systems (such as a steering system, acceleration system, deceleration system, power system, etc.).

In some implementations, the object data from the retrieved portion of the log data may be revised prior to running the simulation by using the server computing devices 410 to process the sensor data from the retrieved portion of the log data. The processing of the sensor data performed by the server computing devices 410 may be the same or different as the processing performed by the vehicle's computing devices 110.

Figure 6:
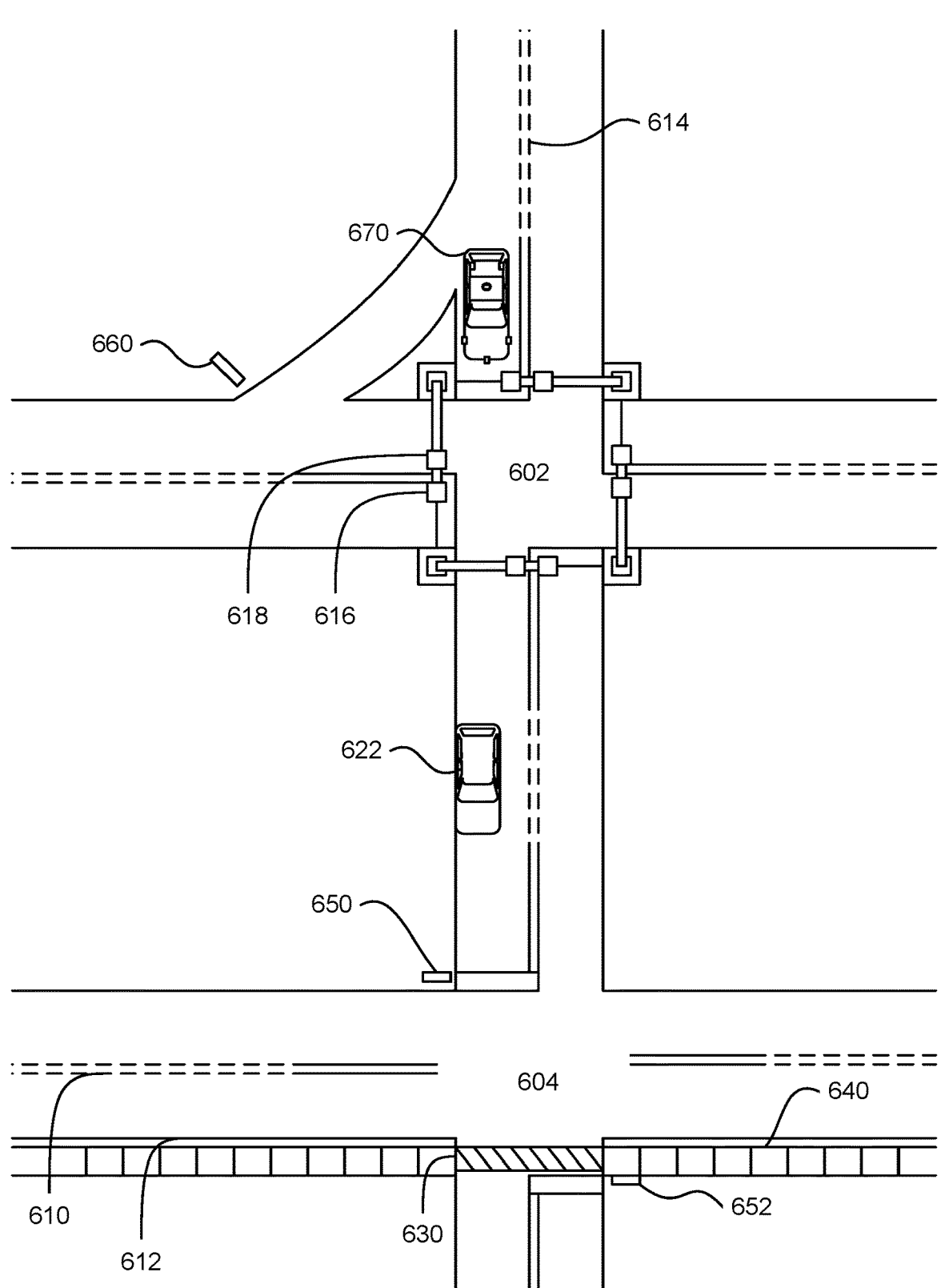
FIG. 6 is an example representation of a simulation in accordance with aspects of the disclosure.

FIG. 6 provides an example 600 of a simulated scene for a section of roadway corresponding to the map information 200. In this example, intersections 602 and 604 correspond to intersections 202 and 204, respectively. This regard, the shape, location, and other characteristics of lane lines 610, 612, 614, traffic signal lights 616, 618, crosswalk 630, sidewalks 640, stop signs 650, 652, and yield sign 660 corresponds to the shape, location and other characteristics of lane lines 210, 212, 214, traffic signal lights 220, 222, crosswalk 230, sidewalks 240, stop signs 250, 252, and yield sign 260. In example 600, a simulated autonomous vehicle 670, corresponding to vehicle 100 or vehicle 100A, is approaching an intersection 604 from an initial location in a first direction. An agent vehicle 620, generated from sensor data and/or event data from the log data for the simulation, is also approaching intersection 604 from a second direction opposite the first direction. Meanwhile, an agent vehicle 622 is in a same lane as the simulated autonomous vehicle 670 and is parked in between the initial location of the simulated autonomous vehicle 670 and the intersection 604.

In some instances, the autonomous control software is only provided with information which the perception system 172 would be able to detect about the scenario, and not every detail of the scenario. For instance, returning to example 600, the server computing devices 410 may run the scenario such that the autonomous control software is given access to the detailed map information 200 as well as any information that would be detected by a perception system of the simulated vehicle 670.

To run the simulation to compare the behavior of the autonomous control software to a manually-driven vehicle, the server computing devices 410 may create a plurality of path segments for the portion of the route based on the retrieved portion of the log data. Each of the plurality of path segments may be defined by a start point in a lane and an end point in a lane that the manually-driven vehicle traveled through while on the route. In particular, the start point and the end point may be defined by a position of the manually-driven vehicle at a start of a time segment and at an end of the time segment. The time segment in this example may be, for example, every 5 seconds, every 10 seconds, or the like. The time segments may be relatively short, such that the resulting path segments corresponding to each time segment are also relatively short.

Figure 7:
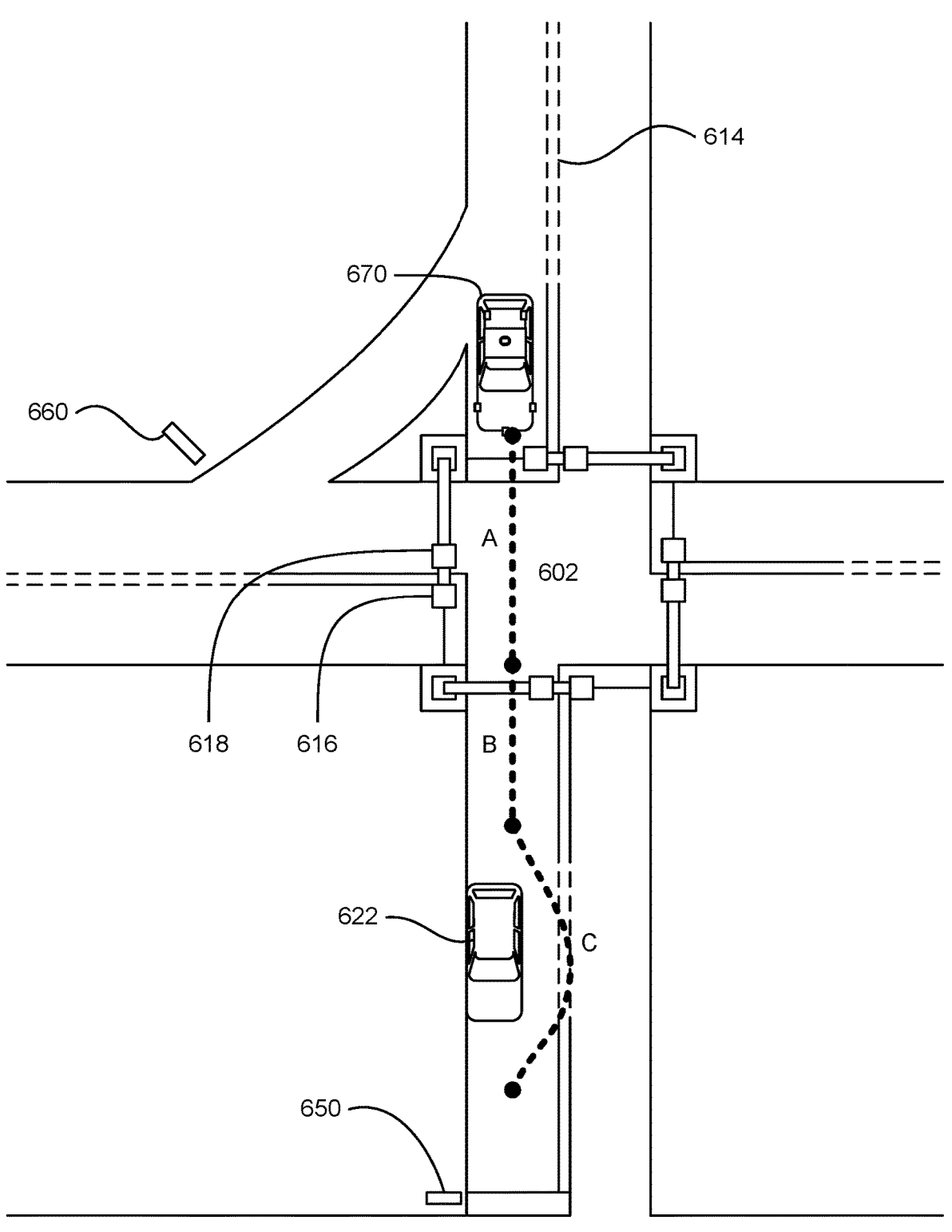
FIG. 7 is a further example representation of a first simulation in accordance with aspects of the disclosure.
Figure 8:
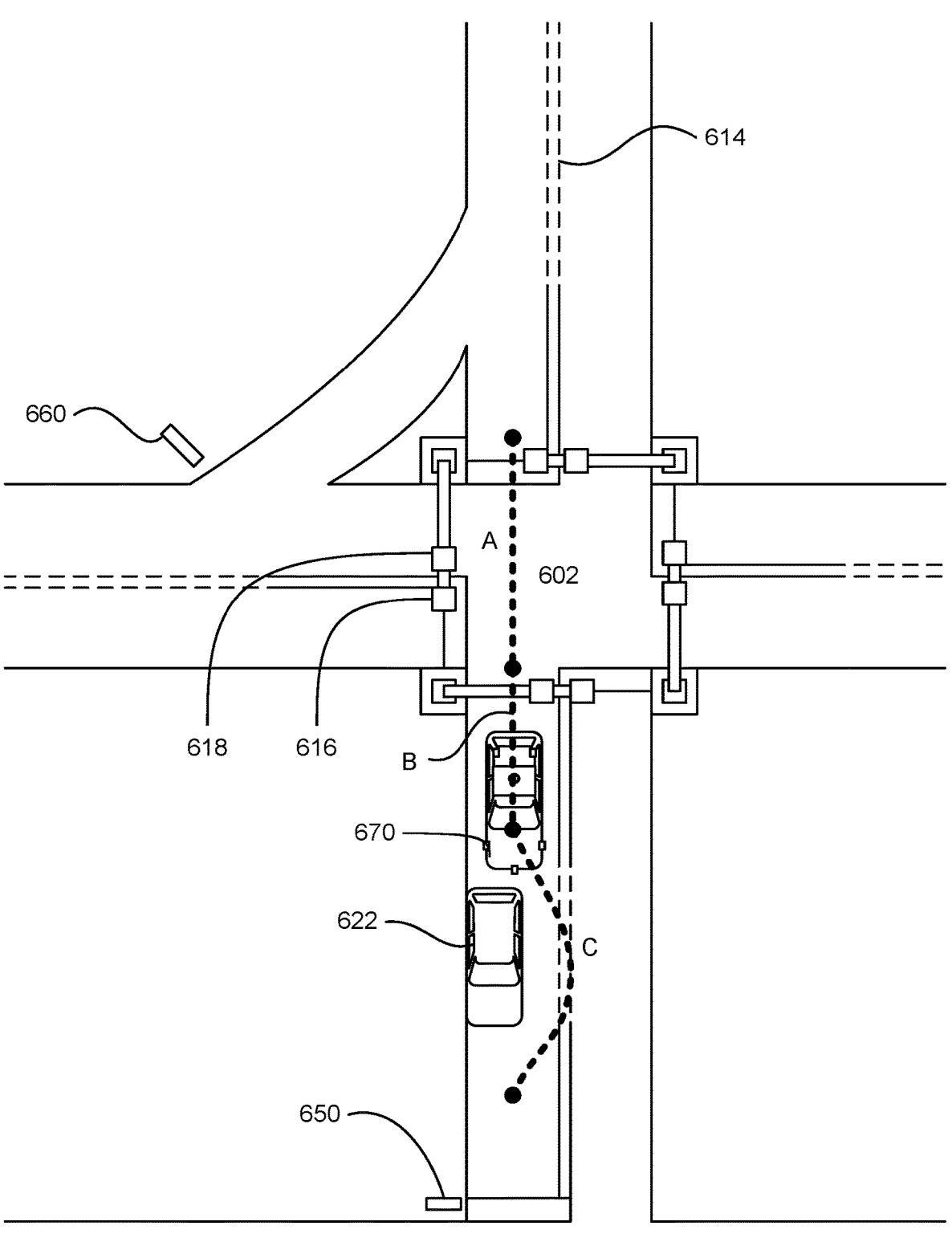
FIG. 8 is another example representation of the first simulation in accordance with aspects of the disclosure.

FIGS. 7 and 8 depict a first simulation 700 corresponding to a portion of the simulated scene shown in FIG. 6. The first simulation includes the roadways around intersection 602 and the roadway between intersections 602 and 604. In particular, the first simulation may be selected and run to test how the autonomous control software handles vehicles parked on an edge of a road, such as agent vehicle 622, and/or double lane lines in comparison to a human driver. FIG. 7 shows a start of the first simulation, and FIG. 8 shows an end of the first simulation. As shown in FIGS. 7 and 8, path segments A, B, and C are created for the first simulation based on the positions of the manually-driven vehicle at a first timestamp, a second timestamp, a third timestamp, and a fourth timestamp. The timestamps are separated by 5 seconds. Path segment A starts at the first timestamp and ends at the second timestamp; path segment B starts at the second timestamp and ends at the third timestamp; and path segment C starts at the third timestamp and ends at the fourth timestamp.

Figure 9:
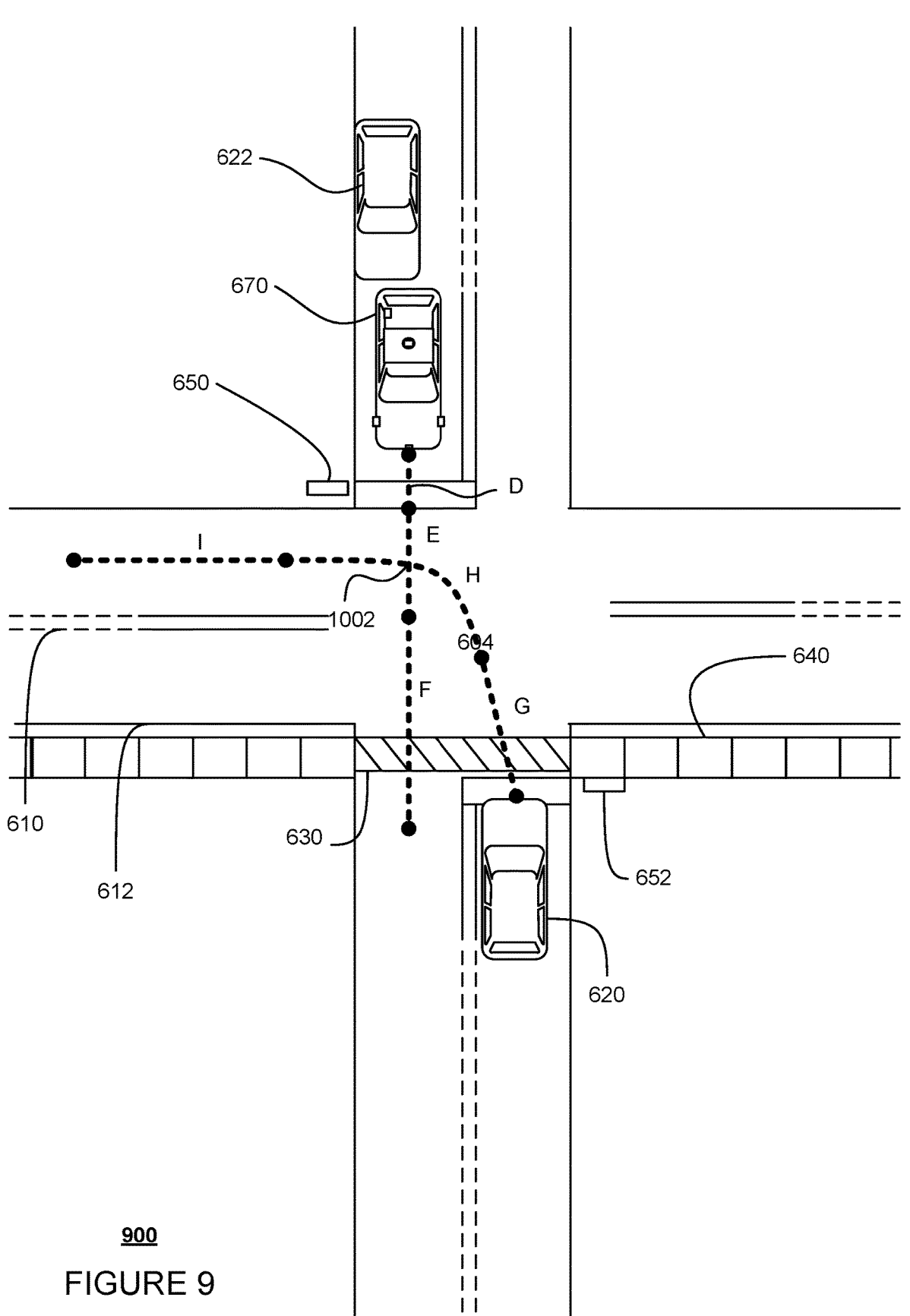
FIG. 9 is an example representation of a second simulation in accordance with aspects of the disclosure.
Figure 10:
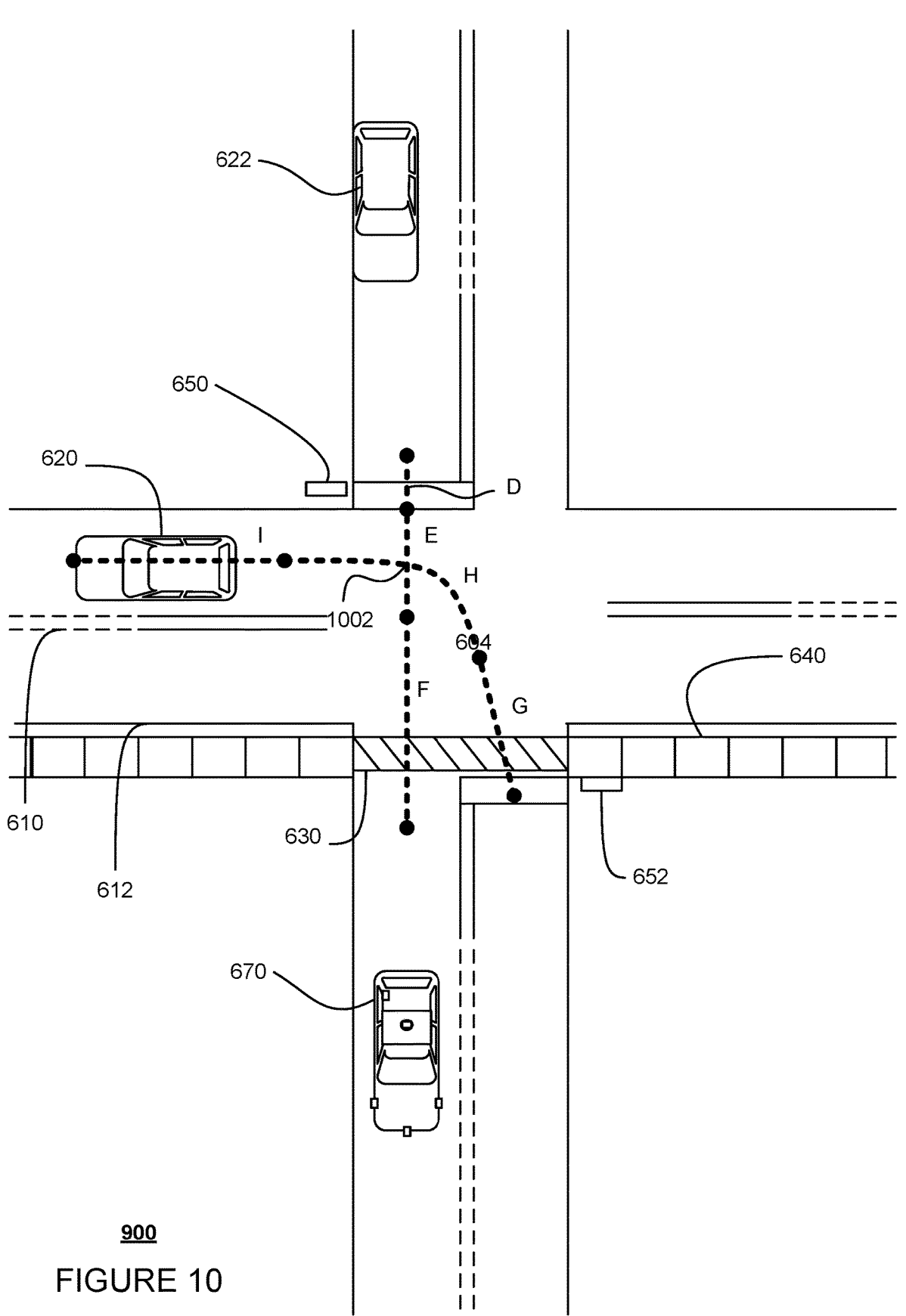
FIG. 10 is another example representation of the second simulation in accordance with aspects of the disclosure.

FIGS. 9 and 10 depict a second simulation 900 corresponding to a portion of the simulated scene shown in FIG. 6. The second simulation includes the roadways around intersection 604. In particular, the second simulation may be selected and run to test how the autonomous control software handles stop signs and/or intersections in comparison to a human driver. FIG. 9 shows a start of the second simulation, and FIG. 10 shows an end of the second simulation. As shown in FIGS. 9 and 10, path segments D, E, and F are created for the second simulation based on the positions of the manually-driven vehicle at a fifth timestamp, a sixth timestamp, a seventh timestamp, and an eighth timestamp. The timestamps are separated by 5 seconds. Path segment D starts at the fifth timestamp and end at the sixth timestamp; path segment E starts at the sixth timestamp and ends at the seventh timestamp; and path segment F starts at the seventh timestamp and ends at the eighth timestamp.

FIGS. 9 and 10 also show a trajectory of the agent vehicle 620 based on the retrieved log data. For this discussion, the trajectory has also been broken down into path segments G, H, and I to illustrate the relationship between the pedestrian and the manually-driven vehicle over time, though the server computing devices 410 may or may create these pedestrian path segments. Path segments G, H, and I correspond to the same time frames as path segments D, E, and F, respectively. As depicted, the agent vehicle's trajectory is a left turn through intersection 604. According to the log data, the manually-driven vehicle passed straight through intersection 604 after the agent vehicle's trajectory left turns through intersection 604.

The server computing devices 410 may run the simulation for the autonomous control software using the plurality of path segments. In the simulation, the autonomous control software may guide a simulated autonomous vehicle along the portion of the route by traveling between the start and end points of each path segment. The short length of the path segments may allow the simulated autonomous vehicle to follow the same path as the manually-driven vehicle, thereby preventing the software for the autonomous vehicle from taking a different path between the two end points. The simulation includes stationary and moving objects according to the object data collected using the manually-driven vehicle 100. During the simulation, the autonomous control software may make determinations regarding a travel of the autonomous vehicle along the portion of the route given the objects and situations provided in the simulation. For example, the autonomous control software may determine a speed of the autonomous vehicle at points along the route, an orientation of the autonomous vehicle at points along the route, and/or an acceleration/deceleration of the autonomous vehicle at points along the route. The simulation may last a same amount of time as the time taken by the manually-driven vehicle to travel through the plurality of path segments.

The first simulation may last 15 seconds (5 seconds per path segment). As shown in FIG. 8, at the end of the first simulation, the simulated autonomous vehicle 670 may be stopped behind agent vehicle 622, which is parked on an edge of the lane in which the simulated autonomous vehicle 670 is travelling. In the course of the first simulation, the simulated autonomous vehicle 670 has not crossed the double lane lines to maneuver around the parked vehicle 622. At this end position, the simulated autonomous vehicle 670 has reached the end of path segment B, stopped behind the agent vehicle 622, and has not progressed to the end of path segment C where the manually-driven vehicle was after 15 seconds.

The second simulation may last 15 seconds (5 seconds per path segment). As shown in FIG. 10, at the end of the second simulation, the simulated autonomous vehicle 670 may have passed straight through intersection 604 and progressed beyond the end of path segment F, where the manually-driven vehicle was after 15 seconds. In the course of the second simulation, the simulated autonomous vehicle 670 stopped for a shorter period of time at the stop sign 650 than the manually-driven vehicle. The simulated autonomous vehicle 670 then crosses intersection 604 before the agent vehicle 620 turns through the intersection 604. Therefore, at 10 seconds elapsed, the manually-driven vehicle is at the end of path segment E, which is in the middle of intersection 604, while the simulated autonomous vehicle has reached or passed the opposite side of intersection 604.

The results of the simulation may correspond to the event data of log data, and may therefore include information such as collisions or near collisions with other objects, planned trajectories describing a planned geometry and/or speed for a potential path of the simulated autonomous vehicle, locations of the simulated vehicle at different times, orientations/headings of the simulated autonomous vehicle at different times, speeds, accelerations and decelerations of the simulated autonomous vehicle at different times in the simulation, classifications of and responses to perceived objects, behavior predictions of perceived objects, status of various simulated systems (such as acceleration, deceleration, perception, steering, signaling, routing, power, etc.) of the simulated autonomous vehicle at different times including logged errors, inputs to and outputs of the various systems of the simulated autonomous vehicle at different times in the simulation, etc.

The server computing devices 410 may extract metrics from the log data of the manually-driven vehicle and from simulation data of the simulated autonomous vehicle. For example, the metrics may include a distance metric for total distance traveled by a vehicle, a speed metric for a final speed of a vehicle at the end of the portion of the route, or a time metric for a point in time or a length of time for a vehicle to reach points along the portion of the route. In some implementations, the one or more metrics may also include a point in time another object reaches various points along the portion of the route. The metrics include one or more first metrics for the manually-driven vehicle and one or more second metrics for the simulated autonomous vehicle.

For the first simulation, the distance metric for the manually-driven vehicle may be 175 meters, and the distance metric simulated autonomous vehicle may be 110 meters. The speed metric for the manually-driven vehicle may be 10 meters per second final speed, and the speed metric for the simulated autonomous vehicle may be 0 meters per second final speed. The time metric for the manually-driven vehicle may be 15 seconds to reach the end of the portion of the route, and the time metric for the simulated autonomous vehicle may be infinite seconds since the simulated autonomous vehicle did not reach the end of the portion of the route. For the second simulation, the distance metric for the manually-driven vehicle may be 75 meters, and the distance metric for the simulated autonomous vehicle may be 150 meters. The speed metric for the manually-driven vehicle may be 8 meters per second final speed, and the speed metric for the simulated autonomous vehicle may be 10 meters per second final speed. The time metric for the manually-driven vehicle may be 15 seconds to reach the end of the portion of the route, and the time metric for the simulated autonomous vehicle may be 10 seconds.

Based on the one or more metrics, the server computing devices 410 may determine a difference between a first progress of the manually-driven vehicle along the route and a second progress of the simulated autonomous vehicle along the route. In particular, the difference may be that the simulated autonomous vehicle has progressed less than the manually-driven vehicle or has progressed more than the manually-driven vehicle. In some implementations, the difference between the progress of the manually-driven vehicle and that of the simulated autonomous vehicle may be a metric that is extracted from the simulation.

For example, when a first distance traveled by the manually-driven vehicle is greater than a second distance traveled by the simulated autonomous vehicle within a same amount of time, it may be determined that the simulated autonomous vehicle has progressed less than the manually-driven vehicle. When a first final speed of the manually-driven vehicle is greater than a second final speed of the simulated autonomous vehicle in this scenario, the difference in the progress of each vehicle would become even greater over time.

As shown in FIG. 8, the first distance traveled by the manually-driven vehicle (175 meters) is greater than second distance traveled by the simulated autonomous vehicle in the first simulation (110 meters). As a result, the server computing devices 410 may determine that the simulated autonomous vehicle in the first simulation has progressed less than the manually-driven vehicle. The determination may also be based on the time metric of the manually-driven vehicle (15 seconds) being shorter than the time metric of the simulated autonomous vehicle (infinite seconds).

When the first distance traveled by the manually-driven vehicle is less than the second distance traveled by the simulated autonomous vehicle, it may be determined that the simulated autonomous vehicle has progressed further than the manually-driven vehicle. As shown in FIG. 10, the first distance traveled by the manually-driven vehicle (75 meters) is less than the second distance traveled by the simulated autonomous vehicle in the second simulation (150 meters). As a result, the server computing devices 410 may determine that the simulated autonomous vehicle in the first simulation has progressed further than the manually-driven vehicle. The determination may also be based on the time metric of the manually-driven vehicle (15 seconds) being longer than the time metric of the simulated autonomous vehicle (10 seconds). In some examples, a threshold difference between the first distance traveled by the manually-driven vehicle and the second distance traveled by the simulated autonomous vehicle may be used to define when the simulated autonomous vehicle has progressed less than or further than the manually-driven vehicle. The threshold difference may be, for example, 10 meters.

Further details of the difference in progress may be determined, such as points where there are differences in velocity, a cause of the difference in progress (a parked vehicle, a traffic light, etc.), a type of maneuver that contributes the greatest to the difference, or a severity of the difference between the first and second progresses. For example, a time metric for how long it takes to reach a point along the route may be computed each of the manually-driven vehicle, the simulated autonomous vehicle, and an object detected by the perception system. The object may have a trajectory that intersects with the portion of the route. When the time metric for the object falls between the time metrics for the simulated autonomous vehicle and the manually-driven vehicle, then the object may be identified as the cause of the difference in progress. In another example, the severity of the difference may indicate how great the difference is, whether the simulated autonomous vehicle becomes stuck during simulation and for how long, or a passenger experience measurement associated with the simulated autonomous vehicle. The passenger experience measurement may be related to satisfaction, comfort, motion sickness, protection, or other passenger physical or emotional state.

In the second simulation, the time metrics for the manually-driven vehicle, the simulated autonomous vehicle, and the agent vehicle 620 may be computed for point 1002 along the route, where the trajectory of the agent vehicle 620 intersects the path segment H. The time metrics for reaching point 1002 may be 8 seconds for the manually-driven vehicle, 3 seconds for the simulated autonomous vehicle, and 6 seconds for the agent vehicle 620. Because the time metric for the agent vehicle (6 seconds) falls between that of the manually-driven vehicle (8 seconds) and the simulated autonomous vehicle (3 seconds), the agent vehicle 620 may be identified as the cause of the difference in progress between the manually-driven vehicle and the simulated autonomous vehicle.

An adjustment to the software may be determined based on the determined difference. The adjustment may also take into account the further details of the difference in progress.

When the log data for the manually-driven vehicle is for when the manually-driven vehicle was driven by a trained driver, the adjustment made be to cause the software to operate the autonomous vehicle more similarly to the manually-driven vehicle. In some examples, the adjustment may include altering a parameter, such as a passenger discomfort level permitted, for a type of location or a type of maneuver associated with the portion of the route. When a simulated autonomous vehicle progresses further than a manually-driven vehicle in a simulation, such as the second simulation, the passenger discomfort level for two-way stop signs may be decreased in the autonomous control software used in the simulation to cause the software to operate the autonomous vehicle more similarly to the manually-driven vehicle. In other examples, the adjustment may include changing an amount of buffer or affinity given to other detected vehicles, such as stalled or double-parked vehicles. When a simulated autonomous vehicle progresses less than a manually-driven vehicle due to another object in a simulation, such as the first simulation, the amount of buffer for the object and other objects of the same type may be decreased in the autonomous control software used in the simulation to cause the software to operate the autonomous vehicle more similarly to the manually-driven vehicle. Other parameters that may be adjusted include a tolerance for proceeding in partial occlusion situations, appropriateness of proceeding into an intersection in congested traffic, or appropriateness of yielding to cross-traffic distant or low-speed objects, such as a pedestrian or cyclist.

The adjustment to the software may additionally be determined based on a driving style of the manually-driven vehicle. The driving style may be determined using the log data of the manually-driven vehicle. For example, based on speed or acceleration data in the log data, the driving style may be characterized as degrees of caution or assertiveness. In some implementations, the degrees of caution or assertiveness may be identified using a statistical distribution of a plurality of manually-driven vehicles. The adjustment to the software may be made in order to cause an autonomous vehicle operated by the software to behave closer to a vehicle driving with a median or average degree of caution or assertiveness. If the driving style of the manually-driven vehicle has a high degree of assertiveness and the simulated autonomous vehicle progresses further than or similarly to the manually-driven vehicle, the adjustment to the software may be made to cause the autonomous vehicle operated by the software to progress less than the manually-driven vehicle. If the driving style of the manually-driven vehicle has a high degree of caution and the simulated autonomous vehicle progresses less than or similarly to the manually-driven vehicle, the adjustment to the software may be made to cause the autonomous vehicle operated by the software to progress further than the manually-driven vehicle.

In some implementations, the adjustment to the software may be made after running multiple simulations using the software to establish a pattern regarding the difference in progress with a manually-driven vehicle. The multiple simulations may include repeat simulations of the same portion of the route using the software, simulations using the software on similar types of routes, or simulations using the software on different portions of the route of the same manually-driven vehicle. In some examples, the pattern includes determining a statistical distribution of an amount of difference in progress or determining that a further progress or a lesser progress occurs at least a threshold amount, such as 50% of the time, or more or less.

In other implementations, the adjustment to the software may be made using a machine learning system, such as a machine learning system that uses a model to test and select parameters that increase the likelihood that the simulated autonomous vehicle progresses the same or similar to the manually-driven vehicle. The machine learning system may run multiple simulations using different settings for parameters and select parameters relative to the progress of a manually-driven vehicle according to the desired adjustment.

The adjusted software may be installed in an actual autonomous vehicle to control the autonomous vehicle. The determined adjustment, the adjusted software, or an indication of the adjustment may be provided by the server computing devices 410 to a vehicle computing device. In some cases where a software already installed on the actual autonomous vehicle has common elements and different elements with the adjusted software, only the different elements are updated or installed.

In other implementations, the simulation may be used to test a plurality of software for autonomous vehicles and select one software based on the determined difference in progress from the manually-driven vehicle. The plurality of software may include the same base software with different parameters or other differing elements. The selected software may be the software that has the least difference in progress from the manually-driven vehicle. In other words, the selected software may be the software that performs closest to the manually-driven vehicle in the simulation.

In a further implementation, the simulation may be used to estimate a rate or frequency of progress issues for autonomous vehicles in a region of roadways or one or more types of roadways. The region may be, for example, a particular city. For the region, the simulation may be run using a given software and log data for a manually-driven vehicle for the region. Additionally or alternatively, the log data for a manually-driven vehicle for same or similar types of roadways found in the region may be used in the simulation. The frequency or rate in which a difference of progress occurs in the simulation for a given type of roadway, such as a two-way stop intersection, may be determined. Based on a number of the given type of roadway in the region, the server computing devices 410 may estimate a rate or frequency of progress issues in the region. The estimated rate or frequency of progress issues for a first region may be compared with the estimated rate or frequency of progress issues for a second region in order to compare software performance from region to region. The software may then be customized for a given region.

In some alternative implementations, a plurality of simulations may be run using log data for a plurality of manually-driven vehicles in a same or similar manner as described above. The plurality of manually-driven vehicles may be driven on a same portion of the route or a similar type of route. The progress of the simulated autonomous vehicle using the software may be compared with the progress of each of the manually-driven vehicles by extracting one or more metrics as described above. The comparison may also be based on the driving style of each of the plurality of manually-driven vehicles.

FIG. 11 shows an example flow diagram 1100 of some of the examples for testing software configured to control a vehicle in an autonomous driving mode, which may be performed by one or more processors such as processors of computing devices 410. For instance, at block 1110, log data collected for the manually-driven vehicle driving along a route may be retrieved. At block 1120, a plurality of path segments may be generated for a portion of the route. The plurality of path segments corresponds to points in a lane that the manually-driven vehicle traveled through on the portion of the route. At block 1130, a simulation of the autonomous vehicle driving along the plurality of path segments may be run using a software of the autonomous vehicle. At block 1140, metrics may be extracted from the log data and the simulation. At block 1150, a difference between a first progress of the manually-driven vehicle and a second progress of the simulated autonomous vehicle may be determined based on the metrics.

The technology described herein allows for efficient identification of key differences between the behavior of a simulated autonomous vehicle and that of a manually-driven vehicle. The key differences may also be more accurately identified by using manual driving data than using previous versions of the software for autonomous vehicles. The key differences may then be used to adjust the software for autonomous vehicles to generate a better ride experience for passengers of an autonomous vehicle by reducing overyielding and increasing caution depending on the circumstances. Driving autonomously in city environments may therefore be improved. The software may be continually improved using the simulation technology.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:

receiving, by one or more processors of one or more server computing devices, log data of a manually-driven vehicle driven along a portion of a route;

identifying, by the one or more processors, a plurality of path segments corresponding to the portion of the route;

based on the identifying, running, by the one or more processors, using software for autonomous driving, a simulation of a simulated autonomous vehicle driving along the identified plurality of path segments;

collecting, by the one or more processors, simulation data for the simulated autonomous vehicle while driving along the identified plurality of path segments as the simulation is run using the software for autonomous driving;

comparing, by the one or more processors, the log data with the collected simulation data; and adjusting, by the one or more processors, the software for autonomous driving based on the comparing.

2. The method of claim 1, wherein comparing the log data with the collected simulation data comprises comparing performance of the software for autonomous driving.

3. The method of claim 2, further comprising:

based on the comparing, determining, by the one or more processors, differences between behaviors of the simulated autonomous vehicle and the manually-driven vehicle.

4. The method of claim 3, wherein the differences between behaviors indicate how the software for autonomous driving handles intersections as compared to a human driver.

5. The method of claim 3, wherein the differences between behaviors indicate how the software for autonomous driving handles stop signs as compared to a human driver.

6. The method of claim 3, wherein the differences between behaviors indicate how the manually-driven vehicle performs when responding to and interacting with one or more pedestrians in comparison to the software for autonomous driving.

7. The method of claim 6, wherein the log data identifies one or more of a shape, a speed, a location, and an orientation of the one or more pedestrians.

8. The method of claim 6, wherein the software for autonomous driving is adjusted based on how the manually-driven vehicle performs when responding to and interacting with the one or more pedestrians.

9. The method of claim 1, wherein adjusting the software for autonomous driving comprises altering a parameter for a type of maneuver associated with the portion of the route.

10. The method of claim 1, wherein the log data comprises at least one of sensor data or event data.

11. The method of claim 1, wherein the log data comprises data identifying characteristics of perceived objects, the perceived objects including any of pedestrians or bicyclists.

12. The method of claim 1, further comprising:

extracting, by the one or more processors, one or more metrics from the log data of the manually-driven vehicle and one or more metrics from the collected simulation data of the simulated autonomous vehicle.

13. The method of claim 12, wherein the one or more metrics include at least one of a distance metric, a time metric, a speed metric, or a point in time metric of an object reaching various points along the route.

14. A non-transitory, tangible computer-readable medium on which computer-readable instructions of a program are stored, the instructions, when executed by one or more processors of one or more server computing devices, cause the one or more processors to perform a method comprising:

receiving log data of a manually-driven vehicle driven along a portion of a route;

identifying a plurality of path segments corresponding to the portion of the route;

based on the identifying, running, using software for autonomous driving, a simulation of a simulated autonomous vehicle driving along the identified plurality of path segments;

collecting simulation data for the simulated autonomous vehicle while driving along the identified plurality of path segments as the simulation is run using the software for autonomous driving;

comparing the log data with the collected simulation data; and adjusting the software for autonomous driving based on the comparing.

15. The non-transitory, tangible computer-readable medium of claim 14, wherein comparing the log data with the collected simulation data comprises comparing performance of the software for autonomous driving.

16. The non-transitory, tangible computer-readable medium of claim 15, wherein the method further comprises:

based on the comparing, determining differences between behaviors of the simulated autonomous vehicle and the manually-driven vehicle.

17. The non-transitory, tangible computer-readable medium of claim 16, wherein the differences between behaviors indicate how the software for autonomous driving handles intersections or stop signs as compared to a human driver.

18. The non-transitory, tangible computer-readable medium of claim 16, wherein the differences in behavior indicate how the manually-driven vehicle performs when responding to and interacting with one or more pedestrians in comparison to the software for autonomous driving.

19. The non-transitory, tangible computer-readable medium of claim 18, wherein the log data identifies one or more of a shape, a speed, a location, and an orientation of the one or more pedestrians.

20. The non-transitory, tangible computer-readable medium of claim 18, wherein the software for autonomous driving is adjusted based on how the manually-driven vehicle performs.

21. The method of claim 1, wherein the software for autonomous driving is prevented from taking a different path between two end points of each of the plurality of path segments.

22. The method of claim 1, further comprising determining a difference between a first progress of the manually-driven vehicle along the plurality of path segments and a second progress of the simulated autonomous vehicle along the plurality of path segments.

* * * * *